Oct. 24, 1939.   G. T. RANDOL   2,176,941
MOTOR VEHICLE TRANSMISSION CONTROL
Filed Dec. 18, 1935   5 Sheets-Sheet 1
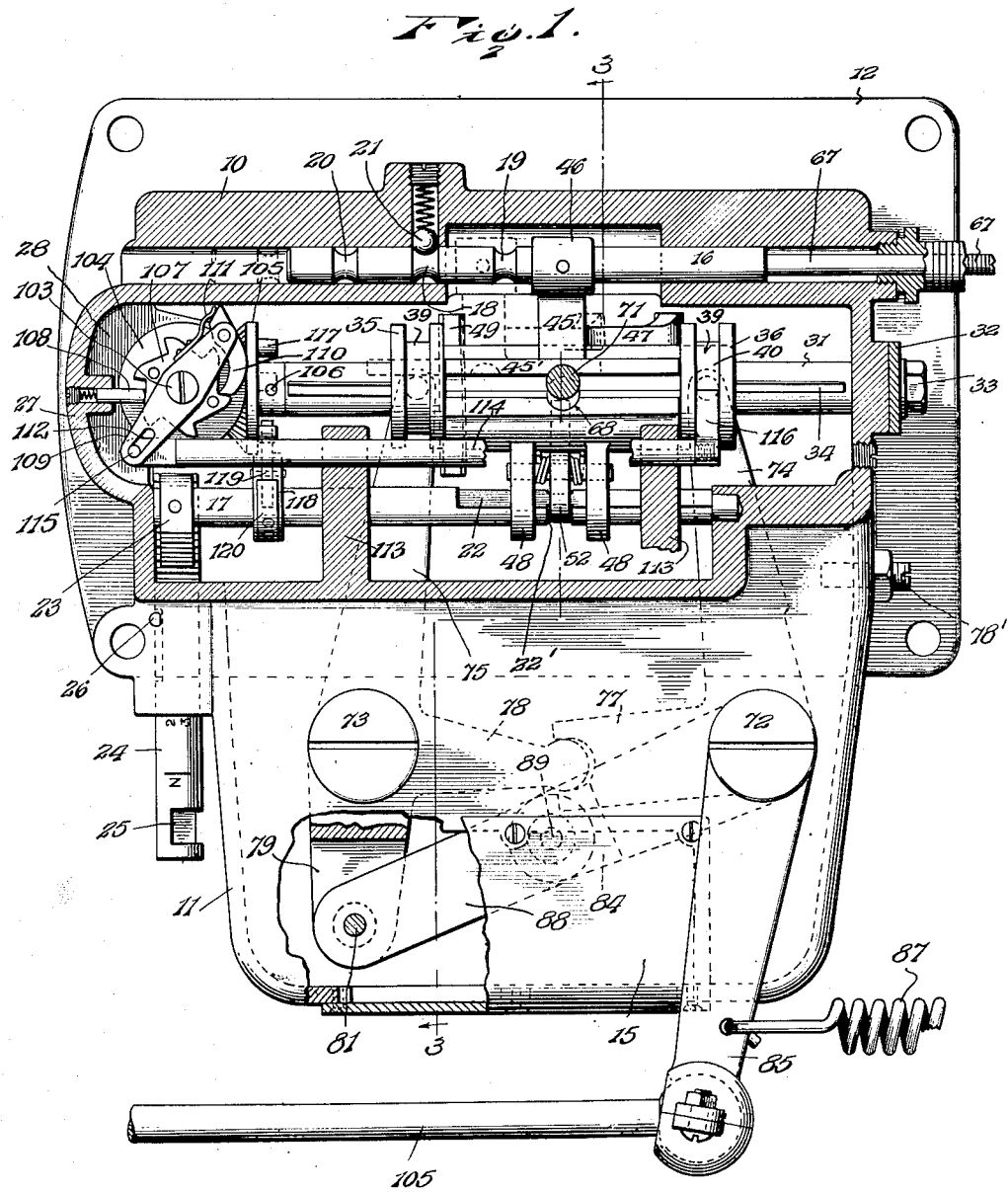
Inventor
G. T. Randol.
By Lacey & Lacey,
Attorneys

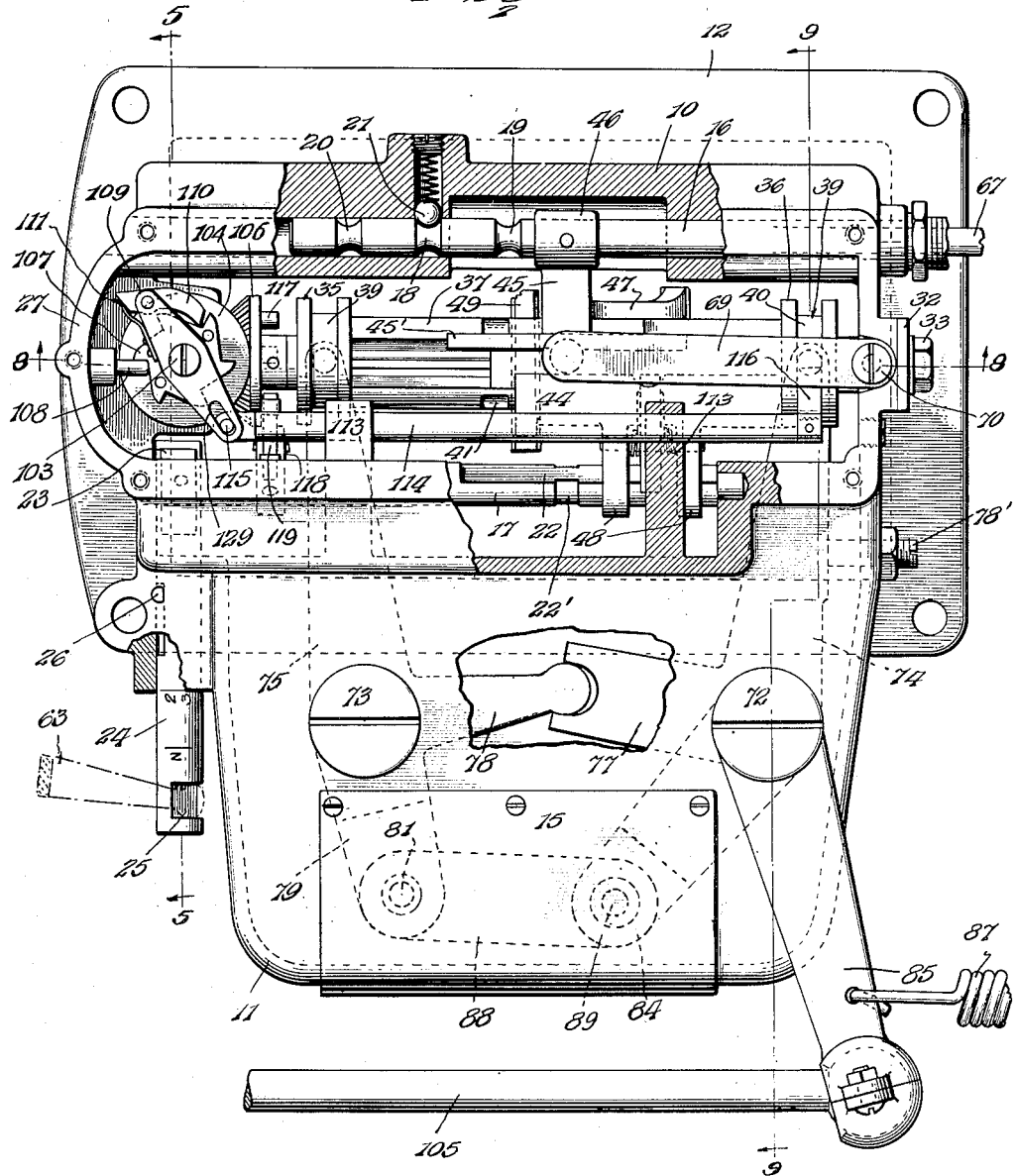

Oct. 24, 1939.   G. T. RANDOL   2,176,941
MOTOR VEHICLE TRANSMISSION CONTROL
Filed Dec. 18, 1935   5 Sheets-Sheet 3
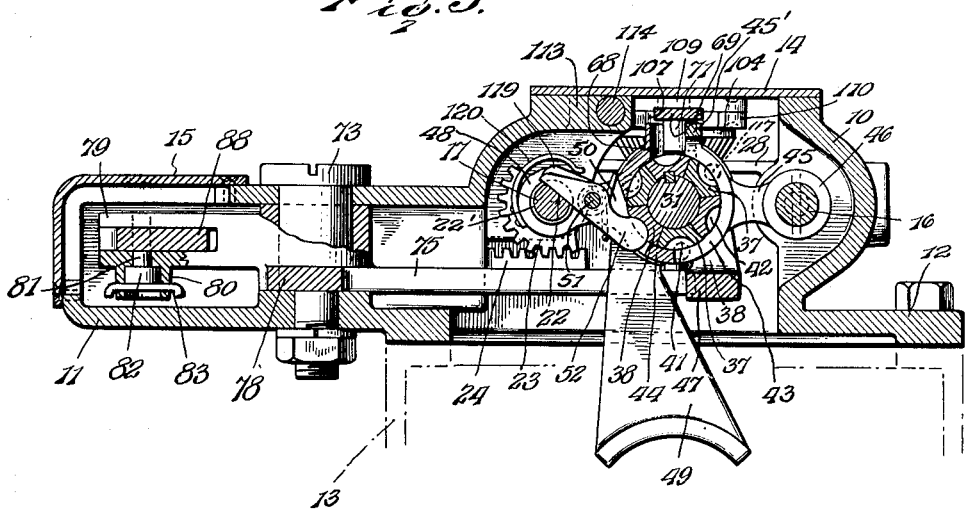
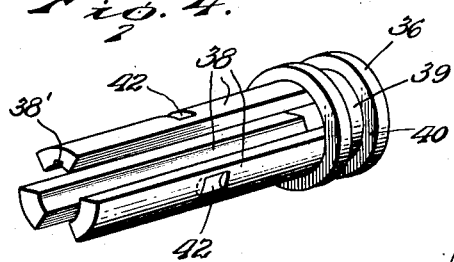
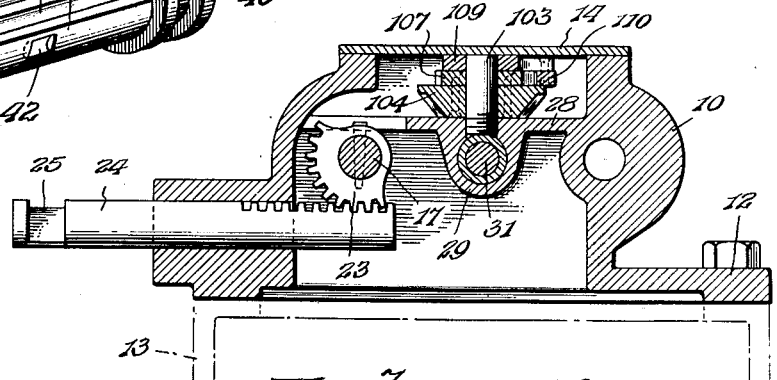
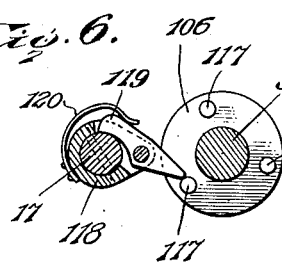
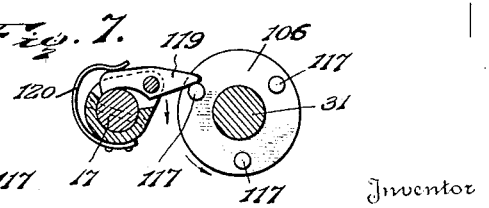
Inventor
G. T. Randol.
By Lacey & Lacey,
Attorneys Oct. 24, 1939.  G. T. RANDOL  2,176,941
MOTOR VEHICLE TRANSMISSION CONTROL
Filed Dec. 18, 1935   5 Sheets-Sheet 4
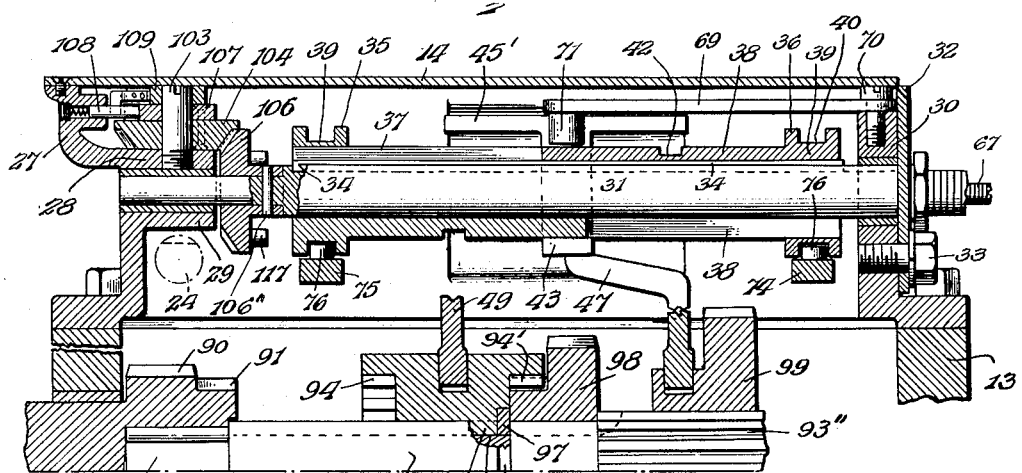
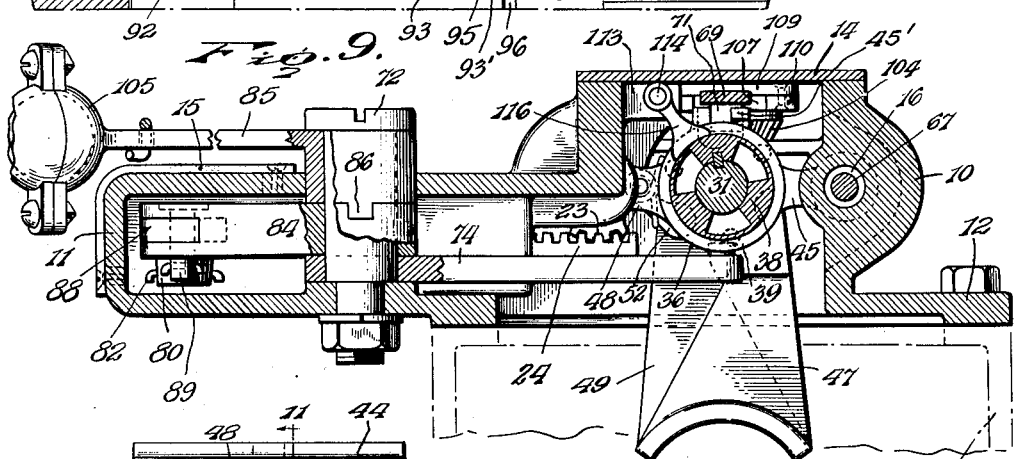
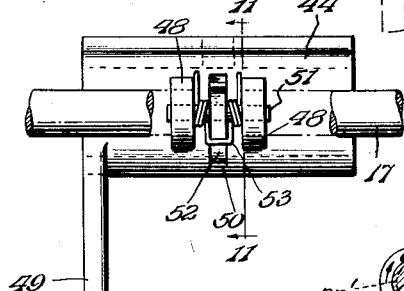
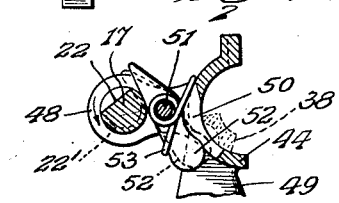
Inventor
G. T. Randol.
By Lacey & Lacey,
Attorneys

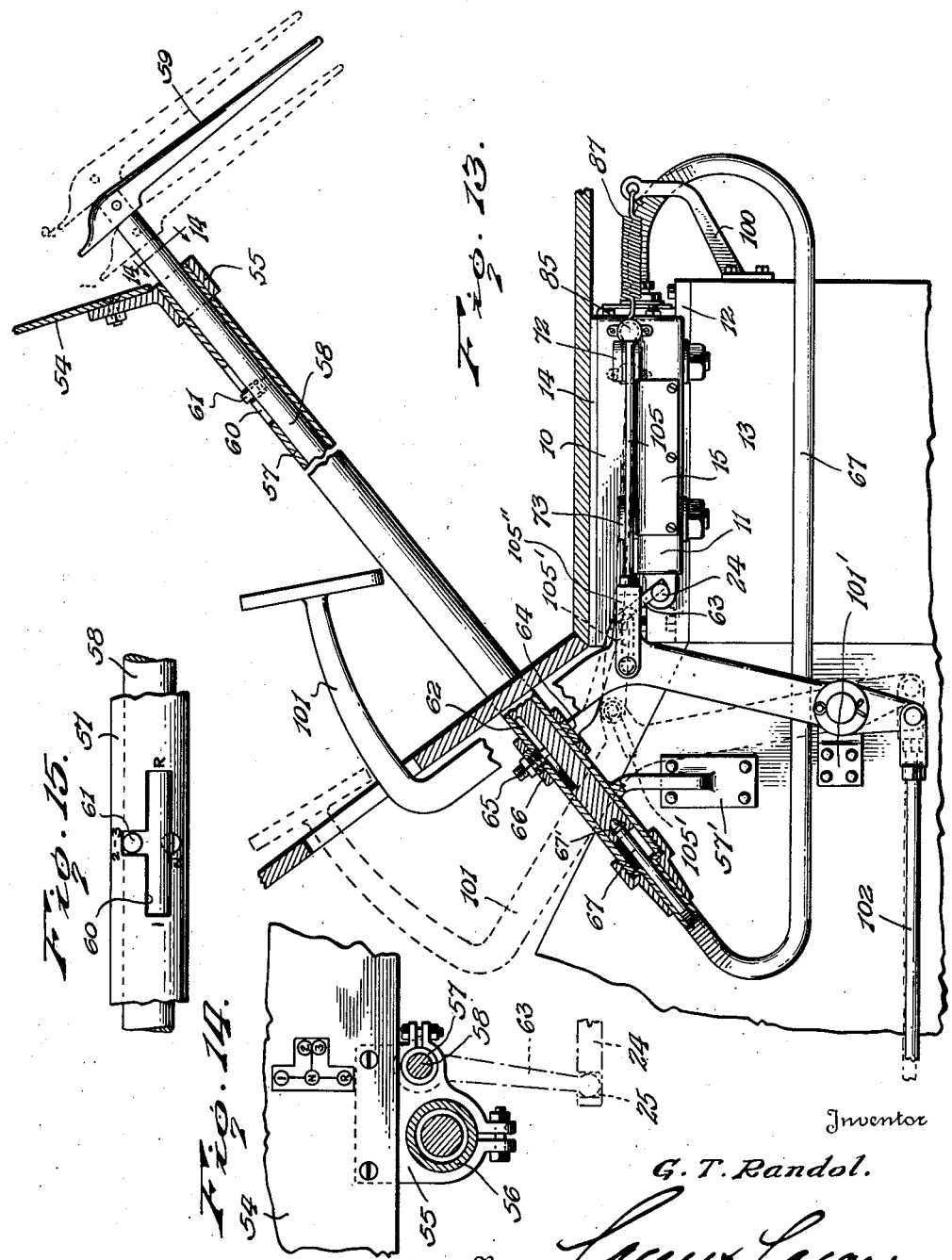

Patented Oct. 24, 1939

2,176,941

UNITED STATES PATENT OFFICE 2,176,941

MOTOR VEHICLE TRANSMISSION CONTROL

Glenn T. Randol, Cape Girardeau, Mo., assignor to The Randol Corporation, St. Louis, Mo., a corporation of Missouri Application December 18, 1935, Serial No. 55,001

22 Claims. (Cl. 74—334)

This invention relates to an improved motor vehicle transmission control of the general character disclosed in Patents Nos. 1,576,065; 1,577,361; 1,648,193; 1,687,591; issued to me March 9, 1926; March 16, 1926; November 8, 1927, and October 16, 1928, respectively, and in my copending application for a similar invention, Serial No. 33,900, filed July 30, 1935, now Patent No. 2,126,032, issued August 9, 1938.

The invention seeks, as a salient object, to provide a mechanism wherein a single setting of the control handle will serve for both second and high speeds and wherein, after reaching high speed, subsequent operation of the mechanism will cause these two speeds to alternately function until neutralized or until low or reverse speed is selected, following which latter operation, the same cycle of first-mentioned operations will again occur if desired, thereby reducing to a minimum the necessity for manual manipulation on the part of the driver in controlling these speeds.

A further object of the invention is to provide, in conjunction with a mechanism wherein the speed gears are neutralized by foot pressure on the clutch pedal and shifted into engaged position by power means effective with the return stroke of said clutch pedal, means whereby the pedal may, after any gear has reached neutral position, be further shifted forwardly without injuring or disturbing the parts or restricting the movement of the selecting or shifting means.

The invention seeks, as another object, to provide a mechanism wherein low and reverse may be selected and rendered active and inactive in the conventional manner by manually operable means exclusively.

The invention seeks, as a further object, to provide a mechanism which may be manually set to automatically select second speed and high speed alternately; wherein these speeds may be alternately rendered active exclusively by power actuated means, automatically, and neutralized exclusively by manually operable means.

Still another object of this invention is to provide means effective coincidentally with the setting of the hand control, for positively locking either gear shifter in the neutral position when the other gear shifter is selected so as to eliminate the yieldable locking methods conventionally employed for this purpose, thereby materially reducing the effort required to shift a selected gear from neutral to engaged position.

A further object of the invention is to provide a mechanism wherein, when manually set to function automatically, second speed will always be initially selected and rendered active automatically so that second speed will always be caused to function prior to the use of high speed.

A further object of the invention is to provide a mechanism wherein all speeds may be neutralized by manually operable means exclusively.

And the invention seeks, as a still further object, to provide a mechanism adapted to supplant the present hand control assembly of conventional types of sliding gear and constant mesh transmissions at substantially the same manufacturing cost without sacrificing the simplicity and dependability of such controls.

Other and incidental objects of the invention not specifically mentioned in the foregoing will appear during the course of the following description, and in the drawings which form part of this application, Figure 1 is a horizontal section showing the position of the parts when the mechanism is neutralized and second speed gear selected, Figure 2 is a view similar to Figure 1 showing the mechanism, actuated to render second speed gear active, with the selectors in their initial normal position, Figure 3 is a transverse vertical section on the line 3—3 of Figure 1, Figure 4 is a detail perspective view of the second speed selector, Figure 5 is a transverse vertical section taken on the line 5—5 of Figure 2, Figure 6 is a view showing the hand controlled selector setting pawl rocked to set the selectors from second to high speed position, Figure 7 is a detail view similar to Figure 6 particularly showing the hand controlled selector setting pawl before being rocked to the position shown in Figure 6, Figure 8 is a vertical longitudinal sectional view on the line 8—8 of Figure 2, Figure 9 is a transverse vertical sectional view taken on the line 9—9 of Figure 2, Figure 10 is a detail elevation of the second and high gear shifter fork, Figure 11 is a detail section on the line 11—11 of Figure 10 showing the shifter fork coupling pawl released in active position, Figure 12 is a view similar to Figure 11 showing the shifter fork coupling pawl locked in inactive position, Figure 13 is a view partly in section and partly in elevation showing my improved mechanism installed upon a conventional sliding gear transmission and particularly illustrating the hand control, Figure 14 is a detail section on the line 14—14 of Figure 13, and Figure 15 is a detail plan view showing the slot in the guide tube of the hand control rod and the stop pin carried by said rod.

In carrying the invention into effect, I employ a casing 10 which, as seen in Figure 3, is provided at the left side thereof with a reduced extension 11 and in this connection, it may be noted that the arrows of the section line 3—3 of Figure 1 joint toward the front end of the casing and the terms "right" and "left" as used herein will be predicated accordingly. Formed on the casing at its lower side is a bottom flange 12 which, as seen in Figures 3, 5, 8, 9 and 13, is shaped to fit over a conventional transmission case, as conventionally illustrated at 13, supplanting the usual transmission case cover, and, as will be observed, the flange 12 is apertured to receive the usual bolts which ordinarily secure the transmission case cover so that, as will be appreciated, the casing 10 may be readily mounted in operative position. Closing the casing 10 at the upper side is a removable cover plate 14 and, preferably, the extension 11 is provided in the top and side walls thereof with an oblong opening to facilitate assembly and inspection of the mechanism, which is normally closed by a removable cover plate 15.

Disposed at opposite sides of the casing are spaced parallel rods 16 and 17, respectively. As best seen in Figures 1 and 2 of the drawings, the rod 16 is mounted for endwise sliding movement and formed in said rod are spaced grooves 18, 19 and 20 adapted to selectively receive a spring pressed ball detent 21. This detent is engageable in the groove 18 to position the rod for neutral, in the groove 19 to position the rod for low gear, and in the groove 20 to position the rod for reverse. The rod 17 is fixed against endwise movement but is mounted to rotate and formed on the rear end portion of the rod is a longitudinally extending flat face 22. Substantially midway the length of the flat face 22 is a circumferentially extending groove 22' for receiving the outer end of the shifter fork coupler pawl 52 to lock the associated shifter fork in the neutral position when the control handle 59 is so set. Fixed to the rod near its forward end is a gear sector 23 and slidable through the left side wall of the casing to coact with said sector is a rack bar 24 provided near its outer end with a notch 25. At one side the rack bar is, as seen in Figure 2, recessed to receive a flat-sided pin 26 locking the bar against rotation and limiting endwise movement of said bar, the bar being movable endwise for oscillating the rod 17 through the medium of the gear sector 23 and control handle 59.

At its forward end, the casing 10, as seen in Figure 8, is provided with an overhanging extension 27, the bottom wall of which provides a shelf 28 and below said shelf the front end wall of the casing is formed with a bearing 29. Alining with the bearing 29 is a bearing 30 on the rear end wall of the casing and journaled in said bearings is a shaft 31 disposed midway between the rods 16 and 17 in parallel relation thereto, the shaft lying in a plane with said rods. The shaft 31 is removable longitudinally through the bearing 30, and normally limiting the shaft against such displacement is a cover plate 32 secured by a cap bolt 33. Extending longitudinally of the shaft is a removable key 34.

Fitting the shaft is a pair of companion selectors 35 and 36 slidable longitudinally on the shaft. As shown in detail in Figure 4, each of the selectors is formed with three circumferentially spaced fingers, the fingers of the selector 35 being indicated at 37 and the fingers of the selector 36 being indicated at 38, as shown in Figure 3. The fingers are sector-shaped in cross section and the fingers of each selector are uniformly spaced so that, as seen in Figure 3, the fingers of both selectors digitate about the shaft 31 and are interlocked to provide an uninterrupted cylindrical surface of their overlapping portions. Connecting the outer ends of the fingers of each selector, as shown in Figure 9, is a cylindrical head 39 which is formed with spaced parallel flanges to provide an annular groove 40. As best illustrated in Figures 4 and 8, one of the fingers 38 of the selector 36 is formed with a groove 38' to slidably accommodate the key 34 so that, due to the fact that the fingers 38 of the selector 36 interlock with the fingers 37 of the selector 35, both selectors are caused to turn with the shaft 31. Formed in the outer faces of the fingers 37 of the selector 35 midway between the ends of said fingers are circumferentially alined high speed sockets 41, while the outer faces of the fingers 38 of the selector 36 are provided with like alined second speed sockets 42.

Surrounding the fingers of the selectors 35 and 36 at opposite sides of the shaft 31 are substantially semi-cylindrical gear shifters 43 and 44, respectively. Extending laterally of the shifter 43, as seen in Figures 1 and 2, is an arm 45 terminating in a sleeve 46 which receives the rod 16 therethrough and is pinned or otherwise fixed to said rod. Depending from the shifter 43 at the lower side thereof, as shown in Figures 8 and 9 of the drawings, is a fork 47 which extends into the transmission case to operatively engage the slidable low and reverse gear 99 of the transmission, said gear being movable forwardly by the shifter for low speed and rearwardly for reverse. It is further to be noted in connection with gear shifter 43 that the upper edge of its semi-cylindrical body terminates forwardly and rearwardly into an elongated flange 45', the purpose of which will later be explained. The length of the semi-cylindrical body is such that the longitudinal movements of the shifter from the central position as shown in Figures 1 and 2 to operate low and reverse speeds is freely accommodated between the selector heads 39 regardless of their axial position and when so moved to engage low or reverse speeds, the flange portion 45' will freely overlie the adjacent selector head 39 as shown in dotted lines in Figure 1 when the selectors 35 and 36 are centralized. The shifter 44, as shown in detail in Figures 10, 11 and 12 of the drawings, is provided medially with spaced parallel arms 48 which slidably receive the rod 17 therethrough so that the shifter may move freely on said rod except when neutralized, and depending from the shifter at its forward end is a fork 49 which extends into the transmission case to operatively engage a clutch member 95 having internal teeth 94 and 94' at opposite ends, said clutch member being movable forwardly by the fork for engagement of the teeth 94 with the external teeth 91 of the high speed gear 90 for rendering the high gear active. Rearward movement of the shifter fork 49 disengages the teeth 94 from the teeth 91 and engages teeth 94' with the cooperating teeth of the gear 98 for rendering the second speed active. It is further to be noted that when the clutch member 95 is centralized between the high gear 90 and the second speed gear 98, both of said gears are rendered inactive. The clutch member 95 has an internal T-portion engaged in a keyway 93' in shaft 93 so that said member is slidable along the shaft but locked to turn therewith. The second speed gear 98 is held against sliding movement longitudinally upon the shaft 93 by being confined between the enlarged splined portion 93" of the shaft on which the low and reverse gear 99 slides and the annular snap ring 97 which is mounted in the groove 96 of the shaft.

Formed in the shifter 44 between the arms 48 is a slot 50 and fixed at its ends in said arms is a transversely extending pivot pin 51. Pivoted upon said pin is a coupling pawl 52 and surrounding the pin at opposite sides of the pawl are the coils of a spring 53 pressing the inner end of the pawl upwardly to project through the slot 50. The inner end of the pawl is rounded to ride against the fingers of the selectors 35 and 36 for selective engagement in the sockets 41 and 42 of said fingers while at its outer end the lower edge of the pawl is straight to project over and ride against the rod 17. Furthermore, it should be noted in this connection that the forward end of the pawl 52 is of a thickness to snugly fit the slot 50 so that the side walls of said slot will support the forward end of the pawl under the load of sidewise drag thereon and prevent canting of the coupling pawl on its pivot pin 51.

As shown in Figure 11, the outer end of the pawl is adapted to have its lower edge face rest flat against the flat face 22 of the rod 17 in which rotative position of the rod the inner end of the pawl may project through the slot 50 so that when the selectors are rotated to dispose any one of the sockets 41 and 42 of the fingers of said selectors in register with the pawl, the inner end of the pawl will drop into said socket for connecting the shifter 44 with either one or the other of the selectors as the case may be for movement endwise therewith to engage a selected gear. When the rod 17 is rotated, however, through the medium of the rack bar 24 and sector 23, the flat face 22 of said rod will be moved from beneath the outer end of the pawl, as shown in Figure 12, and this end of the pawl will then bear against the annular face of the rod or engage in the groove 22', depending on whether a gear, namely second or high, is active or inactive and the shaft 17 will, in either case, coact with the pawl for rocking the outer end thereof upwardly and, consequently, swinging the the pawl to the inactive position in which its inner end will be retracted through the slot 50 and the pawl and related gear shifter 44 will be positively locked due to engagement of the outer end of the pawl in the annular groove 22' of the rod 17. As will be appreciated, the pawl 52 thus provides a means for automatically coupling the shifter 44 with either of the selectors 35 and 36, coincidentally with the release of said shifter, for movement thereby and that the rod 17 and associated parts provides a means for positively locking said coupling and shifter means in inactive position so that the selectors may be freely moved inwardly toward each other, as shown in Figure 1, or outwardly to normal retraced position, as shown in Figure 2, while the shifter 44 will remain stationary. It is important now to note that the gear shifter 44 is shiftable to engage a selected gear through the medium of the coupling pawl 52 during the outward movement of the selectors 35 and 36 and is shiftable to neutralize a previously active speed gear through the medium of the inner flange of the selector head 39 coacting with the end of the semi-cylindrical body of said shifter during the inward movement of the selectors 35 and 36. If the shifter 44 is in the neutral position, the outer end of pawl 52, simultaneously with the rotation of the rod 17, locks the said pawl and gear shifter in neutral position. If either the second or high speed gear ratio is active, then rotation of rod 17 will cause pawl 52 to be moved to an inoperative position where it will remain until the shifter 44 is returned to neutral position. When this position is reached, the outer end of pawl 52 will automatically become positioned in the groove 22' of rod 17, thus locking said shifter against endwise movement until such time as the second or third speed gear ratio is again selected.

Fixed to the instrument board 54 of the associated motor vehicle or other appropriate part, as seen in Figures 13 and 14, is a bracket 55 which accommodates the usual steering post housing 56 and clamped by the bracket to extend at one side of the steering post housing in spaced parallel relation thereto is a guide tube 57, the lower end portion of which projects through the vehicle floor boards and preferably is suitably anchored by a bracket 57' to the power plant housing. Slidable longitudinally as well as rotatable in said tube is a hand operated control rod 58 and fixed to the upper end of said rod is a handle 59. As best brought out in Figure 15, the tube 57 is provided near its upper end with a more or less T-shaped slot 60 and fixed to the rod 58 is a pin 61 which is received in said slot for limiting rotative and axial movement of the rod. Formed in the lower end portion of the rod is a longitudinally extending slot 62 and connected with the rod is a lever 63 provided at its upper end with a sleeve 64 which rotatably fits about the guide tube 57. Screwed through the sleeve 64 is a pin 65 which projects freely through a suitable transverse slot in the guide tube 57 to engage at its inner end in the slot 62 for connecting the lever 63 with the rod 58 to turn therewith. At the same time, however, the slot 62 is adapted to accommodate endwise movement of the rod relative to the lever and fixed to the tube 57 at opposite sides of the sleeve 64 are collars 66 limiting the lever 63 against lateral movement. At its lower end, the lever 63 freely engages in the notch 25 of the rack bar 24 so that, as will be seen, the handle 59 may be manually operated to rotate the rod 58 and swing the lever 63 for setting the rod 17, as previously described. Fixed at the lower end of the rod 58 is a flexible cable 67 which extends rearwardly, as shown in Figure 13, and, as best seen in Figure 1, is connected to the rear end of the rod 16. Accordingly, as will be appreciated, the handle 59 may be manually operated for shifting the rod 58 endwise and actuating the rod 16. It is further noted that the cable 67 is connected to the lower end of the rod 58 by a swiveled joint 67' so that rotation of the rod for selecting neutral and automatic second and high speed position will not be transmitted to the cable 67. This prevents twisting the cable when the rod is turned and the cable will only be moved when the rod is slid longitudinally to actuate low and reverse speeds.

When in neutral position, the shifters 43 and 44 are centralized within the casing 10 to stand opposite each other, as shown in Figure 1, and formed in the upper longitudinal edges of said shifters are oppositely disposed arcuate notches 68. Pivoted at one end upon the rear end wall of the casing, as best shown in Figures 2 and 8, is a latch 69 secured by a pivot screw 70. At its free end the latch is formed with a depending stud 71 which projects between the upper longitudinal flanges of the shifters and is of a diameter greater than the distance between said edges, as shown in Figure 1. Accordingly, as the shifter 43 is moved in either one direction or the other away from neutral position, the elongated flanged portion 45' will coact with the stud 71 for automatically swinging the latch to engage said stud in the notch 68 of the shifter 44 when the latch will function to lock the latter shifter in neutral position. Similarly, as the shifter 44 is moved in either one direction or the other, said shifter will coact with the stud 71 for swinging the latch to engage said stud in the notch 68 of the shifter 43 so that the shifter 43 will be locked in neutral position. Thus the latch provides a means for automatically locking either shifter stationary as the other shifter is moved from neutral position so that by no possibility can both shifters be moved simultaneously to render any two speeds active at the same time.

In the normal position of the parts, the selectors 35 and 36 stand retracted, as shown in Figures 2 and 8 of the drawings and it will now be assumed that the shifters 43 and 44 are both centralized in neutral position, as shown in Figure 1. It will further be assumed that in the foregoing position of parts the handle 59 of the control rod 58 is turned to the left, looking at the handle as it would be viewed by the driver. The pin 61 of said rod will thus be rotated to the left side of the slot 60 in the guide tube 57.

For convenience of description, the left or long side of the slot 60 will be referred to as the manual side while the short or right-hand side of the slot will be referred to as the automatic side. For the same reason, like terms will also be used in connection with the handle 59, the handle being turned to the manual side when rotated to the left and being turned to the automatic side when rotated to the right.

Continuing now with the assumed position of the parts just previously stated, it will be seen that when the handle 59 is turned to the manual side, the lever 63 will be swung for shifting the rack bar 24 inwardly and, consequently, rotating the rod 17 to dispose the flat face 22 of said rod from beneath the outer end of the pawl 52 so that, as previously described, the pawl and gear shifter will be locked in inactive position. Consequently, as also previously described, the selectors 35 and 36 may move independently of the shifter 44.

Attention is now directed to the fact that, regardless of the position of the selectors, as previously described, the heads 39 thereof will not interfere with the free forward and rearward movement of the shifter 43. Accordingly, after the handle 59 has been turned to the manual side, under the conditions previously presumed, it will be seen that said handle may be pushed forwardly to impart forward endwise movement to the rod 58 and consequently shift the rod 16 forwardly to engage the detent 21 in the groove 19 of said rod. The shifter 43 will thus be carried forwardly to render low speed active. Subsequent neutralization of low speed may, of course, be accomplished at any time by simply pulling upwardly or rearwardly upon the handle 59 to return said handle to the position shown in full lines in Figure 13 and return the shifter 43 to the position shown in Figures 1 and 2. Further upward or rearward movement of the handle 59 from neutral position will, of course, serve to pull the rod 6 16 rearwardly to engage the detent 21 in the groove 20 of said rod and actuate the shifter 43 to render reverse active and, of course, reverse may be neutralized at any time by simply pushing forwardly on the handle 59 to return said handle to neutral position and, consequently, return the shifter 43 to neutral position. Thus, as will now be appreciated, low speed and reverse may be readily rendered active or inactive manually. Furthermore, attention is directed to the fact that when the shifter 43 is manually actuated, the shifter 44 will, as previously described, be automatically locked in neutral position by the stud 71 of the latch 69 so that movement cannot be accidentally imparted to the shifter 44.

Extending vertically through the top and bottom walls of the extension 11 of the casing 10, as particularly seen in Figures 3 and 9 of the drawings, are spaced parallel shafts 72 and 73 which, to facilitate the assembling of the structure, carry nuts at their lower ends, and looosely mounted on said shafts are coacting levers 74 and 75 which project inwardly beneath the selectors 35 and 36 and are provided at their forward ends with upstanding studs 76 engaging in the annular grooves 40 of the heads 39 of said selectors. Extending laterally from the hub of the lever 74, as best seen in Figures 1 and 2, is an arm 77 notched at its free end and extending laterally from the hub of the lever 75 is a companion arm 78 rounded at its free end to engage in said notch so that the levers are thus coupled to swing in unison. Screwed through the rear end wall of the casing 10 is a stop 78' adjustable for varying the outward throw of the levers.

Extending rearwardly from the hub of the lever 75 is a yoke 79 and depending from the lower side of said yoke, as seen in Figure 3, is a seat 80. Extending upwardly through the yoke is a pivot pin 81 having a head 82 disposed in said seat and extending through the rim of the seat below said head is a removable key 83 limiting the pivot pin against downward displacement while, at the same time, permitting the pivot pin to freeely rotate on the yoke.

Journaled on the shaft 72 is a toggle arm 84 which, as seen in Figure 9, rests upon the lever 74 and journaled on said shaft above the toggle arm is an operating lever 85, the hub of which is provided at opposite sides thereof with depending lugs 86 which engage in suitable notches in the hub of the lever 84 for connecting said levers to swing in unison. As particularly seen in Figures 1 and 2, a toggle link 88 is connected near its inner end with the lever 84 by a pivot pin 89 and at its other end with the yoke 79 by pivot pin 81.

Normally, the toggle arm 84 and link 88 stand in the position shown in dotted lines in Figure 2 while, as previously indicated, the levers 74 and 75 stand swung apart at their inner or forward ends. The normal position of the arm 84 and link 88, as stated above, is shown in detail in Figure 2 of the drawings and, in this position of the parts, the toggle mechanism may well be termed as being set in its normal position with the mechanism ready to function.

Assuming now that the lever 85 is swung forwardly, the arm 84 will be swung therewith. During the first portion of the forward travel of the lever 85 the arm 84 and link 88 function as a toggle so that as the arm 84 is swung forwardly, the rear end of the lever 75 will move outwardly in a direction away from the shaft 72 through pivot pins 81 and 89. The forward end of the lever 75 will, therefore, be swung inwardly while, as the levers 74 and 75 are connected to swing in unison, the forward end of the lever 74 will, as a result, also be swung inwardly. Accordingly, the selectors 35 and 36 will be simultaneously shifted inwardly toward each other to the position shown in Figure 1.

Figure 1 of the drawings shows, in dotted and full lines, substantially the end of the toggle throw in which position the clutch pedal would assume the dotted position shown in Figure 13. Forward movement of the arm 84 from its initial position, as above described, serves, of course, to swing the link 88 on the toggle pins 81 and 89 to move the selectors 35 and 36 inwardly to the position shown in Figure 1, for neutralizing any active speed, as shall presently be explained; the mechanism will virtually come to rest as the toggle pin 89 crosses over the pivotal center between the shaft 72 and toggle pin 81. Accordingly, the selectors will be permitted to dwell momentarily at the end of their inward throw before subsequently being shifted outwardly away from each other for rendering a selected speed active, as shall also be presently explained. Shock upon the mechanism is thus eliminated as well as providing slight additional forward clutch pedal travel beyond that actually required to neutralize the present mechanism.

Immediately subsequent to the breaking of the toggle, as previously described, the lever 85 will have traveled substantially all of its forward throw. The return movement of the lever 85 also swings the arm 84 in unison through the medium of the toggle connections between the levers 74 and 75; the forward ends of both levers will be swung outwardly away from each other for simultaneously shifting the selectors 35 and 36 apart to their normal positions, as shown in Figure 2.

It will accordingly be seen, in view of the foregoing, that during the forward travel of the operating lever 85, the toggle is effective for swinging the forward ends of the levers 74 and 75 toward each other for centralizing the selectors 35 and 36, which movement imparts a gradually diminishing speed to a gear being neutralized; but conversely, during the rearward travel of the operating lever 85 by the power spring 87 for swinging the forward ends of the levers 74 and 75 away from each other to shift the selectors apart to their initial normal position, a movement of gradually increasing speed is imparted to a selected gear being rendered active while, as the toggle crosses the pivotal center, the parts affected will be caused to momentarily pause to permit synchronization of the gear being engaged and at the same time allow slight additional clutch pedal travel beyond that actually required to neutralize any active speed gear without disturbing the associated parts or hampering the free movement of either the clutch pedal 101 or control handle 59.

Referring now more particularly to Figure 13 of the drawings, I have shown the vehicle clutch pedal at 101, this pedal being adapted to be rocked forwardly for disengaging the clutch of the vehicle and about half of the forward travel of the pedal is sufficient to release the clutch. Suitably mounted upon the vehicle, preferably at the rear of the transmission casing, is a bracket 100 to which is anchored one end of a power spring 87 which extends forwardly therefrom and at its front end is operatively connected to the lever 85.

As will now be seen, when the clutch pedal 101 is rocked forwardly, substantially the first one-half of its forward throw, the rod 102 connected to the clutch release arm (not shown) will disengage the clutch and, since the lever is formed with a slot 105' through which passes a pin carried by a yoke 105" (Figure 13), such movement will be permitted without disturbing the present mechanism, as shown in its normal position in Figure 2 of the drawings. Accordingly, the clutch pedal may be freely manipulated at any time to release the vehicle clutch without affecting the present mechanism. Assuming, however, that the clutch pedal 101 is further rocked forwardly, with the pin of the yoke at the rear end of the slot 105', it will be seen that as said pedal enters the last half of its forward throw, pull will be exerted upon the rod 105 and the operating lever 85 will be moved in unison with the same to set the selectors in position shown in Figure 1 and at the same time storing energy in the power spring 87 by expanding the same. The spring 87 and associated parts thus provide a power actuated means under control of the clutch pedal 101 for automatically moving the operating lever 85 rearwardly to shift a selected gear.

Screwed into the shelf 28, as best seen in Figure 8, is a post 103 and mounted to turn on said post is a bevel gear 104 resting on the shelf. At its forward end, the shaft 31 is reduced and slipped over the reduced portion thereof is a gear 106 secured to the shaft by a pin 106' to mesh with the gear 104. Riveted or otherwise fixed to the upper side of the gear 104, as best seen in Figures 1 and 2 of the drawings, is a ratchet 107 having a total of six teeth to conform to the aggregate number of fingers of the selectors 35 and 36. Mounted to coact with said teeth successively is a spring pressed stop pin 108 limiting the ratchet and gear 104 against retrograde movement.

Journaled on the post 103 to overlie the ratchet 107 is a lever 109 limited against upward displacement by the cover plate 14 and pivoted upon the forward end of said lever is a pawl 110 urged by a spring 111 to coact with the ratchet. At its opposite end, the lever is provided with a slot 112. Extending inwardly from the left side wall of the casing 10 flush with the upper edge thereof, as best seen in Figures 1, 2, 3 and 9 of the drawings, are spaced lugs 113 and slidable longitudinally through said lugs is a rod 114 connected at one end with the lever 109 by a pin 115 which slidably engages in the slot 112 of said lever. Fixed to the opposite end of the rod 114, as particularly seen in Figure 9, is a foot 116 which freely engages in the annular groove 40 of the head 39 of the selector 36. Thus, when said selector is shifted axially, the rod 114 will be moved therewith.

Fixed to the rear side of the gear 106 are three laterally projecting pins 117 equi-distantly spaced circumferentially of the gear and, as brought out in Figure 3, these pins are disposed in alinement with the fingers 37 of the selector 35. Fixed to the forward end portion of the rod 17, as shown in detail in Figures 6 and 7, is a collar 118 provided at the forward side thereof with spaced lateral ears and pivoted between said ears is a pawl 119. As will be observed, the collar is cut away between the ears to receive the pawl while the rear end of the pawl is curved at its lower edge to engage the rod 17 and fixed at one end to the collar is a spring 120, the free end of which engages over the rear end of the pawl for normally holding the pawl in active position projecting from the shaft 17 in the rotative path of the pins 117.

As will be noted, when any one of the pins 117 engages over the free end of the pawl, the pawl will rock against the tension of the spring 120 to permit said pin to continue in its movement with the gear 106. When the rod 17 is turned in a clockwise direction, however, and the forward end of the pawl engages over any one of the pins 117, the rear end of the pawl will coact with the rod so that the pawl will be rigidly supported to coact with said pin for turning the gear 106 as the rod 17 is rotated. Furthermore, it should be noted in this connection that as the pins 117 are three in number and are equi-distantly spaced to aline with the fingers 37 of the selector 35, the pawl 119 will, when swung by the rod 17 to coact with any one of said pins, rotate the gear 105 through an arc of substantially 60° only. Thus, as the selectors 35 and 36 are mounted to turn with the shaft 31, said shaft will, when rotated by the pawl 119 acting on any one of the pins 117, be turned in a counter-clockwise direction to shift a corresponding one of the fingers 38 of the selector 36 out of alinement with the free end of the pawl 52 and dispose a corresponding succeeding one of the fingers 37 of the selector 35 in alinement with the free end of the pawl 52.

Assuming now again that the selectors 35 and 36 stand retracted in normal position, as shown in Figure 2, while the shifters 43 and 44 stand centralized in neutral position, as shown in Figure 1, it will be presumed that the handle 59 is turned to the automatic side. The control rod 58 will thus be rotated in a clockwise direction so that the lever 63 will be swung for retracting the rack bar 24 and setting the rod 17 so that the flat face 22 thereof is disposed beneath the outer end of the coupling pawl 52, as shown in Figures 1, 2 and 11 of the drawings. The pawl 52 will, therefore, as previously described, be permitted to function and at the same time releasing the gear shifter 44 for movement to engage the speed gear selected.

Assuming now that the clutch pedal 101 is depressed, as previously described, it will be seen that the forward ends of the levers 74 and 75 will be first swung toward each other, as heretofore explained in detail, so that the selectors 35 and 36 will first be moved to the limit of their inward throw, as shown in Figure 1. As the selector 36 travels inwardly, the rod 114 will coincidentally be slid forwardly so that the lever 109 will be rocked and the pawl 110 caused to coact with the ratchet 107 for turning the gear 104 one step forward in a clockwise direction. The gear 104 will thus coact with the gear 105 for rotating the shaft 31 one step forward in a counter-clockwise direction with the result that, as shall presently be explained more in detail, the socket 42 of one of the fingers 38 of the selector 36 will be brought into alinement with the free end of the pawl 52. Accordingly, as the selector 36 reaches the end of its inward throw, the inner end of the pawl 52 will drop into said socket for coupling the shifter 44 to said selector. In this connection, it is pertinent to particularly note that the shaft 31 is rotated as the selectors are neutralized so that a future speed which, in the instance taken, is second speed, is automatically selected.

Upon reaching the end of their inward throw, the forward ends of the levers 74 and 75 will then, as previously described, be immediately swung outwardly to their initial position by the power spring 87 on the return stroke of the clutch pedal, energy being created by expansion of the power spring during the neutralizing movement. Accordingly, as the selectors 35 and 36 are shifted outwardly by said levers, the shifter 44 will be carried rearwardly by the selector 36, as shown in Figure 2 for rendering second speed active. Coincidentally, the latch 69 will be swung, as previously described, so that the shifter 43 will be locked in central neutral position by the stud 71 of said latch so that upon release of the clutch pedal 101 the transmission will function in second speed.

It will now be assumed that when second speed is active and the shifter 44 stands in rearward position, the clutch pedal 101 is again depressed to the dotted position shown in Figure 13. The forward ends of the levers 74 and 75 will thus be again caused to swing toward each other and the selectors 35 and 36 again moved inwardly so that the rod 114 will again be moved forwardly for swinging the lever 109 and rotating the gear 104 another step forwardly. Coincidentally, the head 39 of the selector 36 will coact with the adjacent end of the shifter 44 for returning said shifter to neutral position. Second speed will thus be automatically neutralized and as the selectors reach the end of their inward throw, the shaft 31 will be rotated to dispose the socket 41 of one of the fingers 37 of the selector 35 in alinement with the pawl 52 so that the inner end of the pawl will drop into said socket for coupling the shifter 44 to the selector 35. Accordingly, as the forward ends of the levers 74 and 75 are again swung outwardly, as previously described, and the selectors 35 and 36 are returned to their normal position, the shifter 44 will be carried forwardly by the selector 35 for rendering high speed active. Coincidentally, the latch 69 will be automatically swung as previously described, so that the stud 71 will function to lock the shifter 43 in neutral position. Accordingly, upon the release of the clutch pedal 101, the transmission will function in high speed and, of course, as the clutch pedal is released, the lever 85 will be returned to its initial position. It is now pertinent to note that as second speed is automatically neutralized, as just described, the shaft 31 is rotated for automatically selecting a future speed which, in the instance taken, was high speed.

It will now be assumed that while the transmission is functioning in high speed, the clutch pedal 101 is again depressed to the position indicated by dotted lines in Figure 13. As the forward ends of the levers 74 and 75 swing inwardly, the inner flange of the head 39 of the selector 35 will coact with the shifter 44 to return said shifter to neutral position and consequently render high speed inactive. Coincidentally, the rod 114 will be shifted endwise for again turning the gear 104 one step forward so that as high speed is neutralized, the shaft 31 will be rotated to again dispose one of the fingers 38 of the selector 36 in alinement with the inner end of the pawl 52 for again automatically selecting second speed. Consequently, as the selectors reach the end of their inward throw, the inner end of the pawl will drop into one of the sockets 42 of the selector 36 so that when the forward ends of the levers 74 and 75 are swung apart and the selectors returned to their original position, the shifter 44 will be carried rearwardly and second speed again rendered active. Coincidentally, the shifter 43 will be automatically locked by the latch 69 in neutral position while, when the clutch pedal is released, the lever 85 will be reset.

Returning to the previously described rotative setting of the handle 59 on the automatic side, it will now be clear that as the handle is swung and the rod 17 is rotatably set, the pawl 119 will be swung in a clockwise direction with the rod as previously described. Accordingly, if for any reason at the time any one of the fingers 38 of the selector 36 is disposed in alinement with the inner end of the pawl 52, a corresponding one of the pins 117 will, as shown in Figure 7, be disposed in the path of the swinging movement of the pawl 119. The automatic slot also positively locks the low and reverse gear shifter in neutral position when second and high are selected. Therefore, as the rod 17 is set for setting the pawl 52 to function automatically, as previously described, the pawl 119 will act on said pin for turning the shaft 31 one step forward, in a counter-clockwise direction, as previously described, and consequently disposing a corresponding one of the fingers 37 of the selector 35 in alinement with the inner end of the pawl 52. Thus, when the mechanism is subsequently actuated and the shaft 31 is again rotated one step forward in a counter-clockwise direction to automatically select a future speed, as previously described, a corresponding one of the fingers 38 of the selector 36 will be moved into alinement with the inner end of the pawl 52 so that as the forward ends of the levers 74 and 75 with the selectors reach the end of their inward throw, the inner end of the pawl 52 will drop into the socket 42 of said finger for coupling the shifter 44 with the selector 36. Accordingly, as the levers 74 and 75 are subsequently swung outwardly, the shifter 44 will be carried rearwardly for rendering second speed active.

Thus, as will now be appreciated, I provide a mechanism wherein, as manually set to function automatically, the selectors 35 and 36 will be coincidentally set so that subsequently second speed will always be initially selected and rendered active automatically. Ensuing actuation of the mechanism will then serve to automatically select and render high speed active, following which, upon the subsequent actuation of the mechanism, second speed will again be automatically selected and rendered active. As will be appreciated, this automatic selection and rendering active of second and high speeds alternately will continue indefinitely as long as the mechanism remains set to function automatically.

Attention is now directed to the fact that after the mechanism is set to function automatically, a future speed is selected coincidentally with the neutralizing of a previously active speed and this is accomplished by a step by step rotation of the selectors 35 and 36 in a single direction. Furthermore, attention is directed to the fact that when the handle 59 is on the manual side and is pushed forwardly for rendering low speed active, said handle cannot, while low speed is active, be rotatably set to the automatic side. When the transmission is in low speed and the handle 59 is on the manual side, it will be seen upon referring to Figure 15, that the pin 61 will stand at the forward end of the long side of the slot 60. When the handle 59 is turned to the automatic side, the pin 61 will stand at the end of the short slot, as shown.

As will be observed upon further reference to Figure 15, neutral position is disposed midway of the manual side of the slot 60 opposite the automatic slot. Accordingly, as just previously described, the automatic slot is opposite the neutral position. When the handle 59 is set on the automatic side, the mechanism may be quickly neutralized at any time by simply swinging the handle 59 over to the manual side. When the handle is thus swung, the shifter 43 will, as will now be appreciated, remain in the neutral position while the setting of the handle will serve, as previously described, to lock the pawl 52 inactive from the sockets in the selector fingers. Accordingly, when the clutch pedal 101 is depressed, the shifter 44 will be neutralized by the inward throw of the selectors 35 and 36 for neutralizing the speed active and positively locked in this position by the inactive coupling pawl 52 engaging in the groove 22', either second or high as the case may be, and as the pawl 52 is locked inactive, the shifter 44 will not again be shifted as the selectors 35 and 36 are returned to their initial position. Accordingly, the mechanism will be neutralized. It is important to mention here that when either second or high speed is rendered active, said speed is held active by the power spring 87 until neutralized or another speed selection is made.

As will be perceived, low speed is selected and rendered active and inactive manually in the conventional manner, exclusively, regardless of the position of the selectors providing the gear shifter 44 controlling second and high speeds is in the neutral position. Should any difficulty be experienced, however, it is only necessary to depress the clutch pedal 101, the handle 59 being meanwhile permitted to remain on the manual side when, as will be appreciated, the selectors 35 and 36 will be moved inwardly toward each other to coact with the shifter 44 for neutralizing either second or high, as the case may be. When either low or reverse is active, the handle 59 cannot, due to the shape of the slot 60, be rotatably set on the automatic side and, therefore, the active gear must be neutralized before the automatic speeds can be rendered operative.

It is now to be particularly observed that the present mechanism reduces to a minimum the manual effort required to control the different speeds of the vehicle. Assuming that the vehicle is at a standstill and the driver wishes to start the vehicle, a single manual operation will suffice to set the control handle for neutralizing any active speed. As will be appreciated, the control handle may be manually set to render low speed active and inactive, following which a single manual operation will in turn automatically render active and inactive second and high speeds, as desired, after which further operation of the mechanism will cause the automatic speeds, namely, second and high to be rendered operative and inoperative alternately until such time as the control handle is positioned in neutral or low or reverse speed is made operative, following which, by setting the control handle in the automatic slot, the same succession of automatic speeds will again occur. Also, the vehicle may be started in second speed, following which high speed will be automatically rendered active. Subsequent operation of the mechanism will then cause the two highest speeds, namely, second and high, to be rendered operative and inoperative alternately until the manual control is again set, as previously described.

Thus, after an initial setting of the control handle, the vehicle may be operated without the necessity for further hand operations on the part of the driver if the car is started in second speed. Forward position of the control handle sets the mechanism in low speed and when the handle is returned to the neutral position, if desired, another single setting of the handle will obtain second and high speeds. Center position of the control handle on the manual side is neutral for all speeds and the only forward and rearward positions possible for the control handle secures low and reverse, respectively.

The operation of the device is, briefly, as follows:

The driver when ready to start, first fully disengages the clutch by depressing pedal 101 to dotted position shown in Figure 13, and then pressing rod 58 downwardly from the neutral position to manually set the mechanism in low speed; whereupon, engagement of the clutch permits the car to move forwardly in low gear. With the car under way in low speed, the clutch is again disengaged and the rod shifted upwardly to the neutral position and then turned to move the pin 61 into the side notch of the slot 60 to set the mechanism for automatic operation of second and high speeds; whereupon engagement of the clutch renders second speed operative and in order to move into high speed, it is merely necessary to again operate the clutch pedal 101 as previously described. Pressure upon the pedal 101 and then release of said pedal serves to automatically shift from second to high speed and due to the step-by-step rotation of the selectors, repeated manipulation of the pedal will successively and alternately cause second and high speeds to be obtained. Therefore, when necessary to momentarily stop at a street crossing or for any other reason, while driving in high speed, and it is desired to make a new start in second speed; it is merely necessary to fully disengage the clutch which operation automatically rotates the selectors 35 and 36 into position for selecting second speed and when the clutch pedal 101 is released and returns to its normal position to engage the clutch, the automobile will travel forwardly in second speed. By again stepping on the pedal and releasing it, the speed will be changed from second to high and alternately thereafter with each actuation of the clutch pedal, without removing either hand from steering wheel. Therefore, likelihood of an accident due to driver taking one hand from the steering wheel or eyes from the road will be eliminated as well as the strain on the car mechanism due to failure to change from high to second when temporarily stopping the automobile at street intersections, etc. This apparatus also permits gears to be easily shifted from high to second and back again while traveling up a steep hill without removing the hand from the steering wheel, as well as the use of low and reverse speeds in the conventional manner. When the automobile is to be reversed and backed into a parking space or for any other purpose, it is first brought to a full stop and then the rod 58 hand operated, while the clutch is held by the foot fully disengaged, to move pin 61 out of the side notch of the slot 60 to the neutral position and then towards the upper end of said slot. During this latter movement the reverse gear will be rendered active. When the automobile is parked, the rod 58 will be shifted longitudinally to return the pin to the neutral position following which operation the clutch may be engaged with the engine still running without starting the car.

It will thus be seen that this mechanism is hand operated in the conventional manner for low and reverse speeds and when manually set from low to automatic position it will, thereafter, without further hand operations, automatically operate second and high speeds alternately by means of the foot pedal 101 and associated power spring 87.

It is also further evident that the functioning of this mechanism properly synchronizes the gears before engagement and shifts them in correct sequence which prevents stripping or otherwise damaging the gears and the associated parts of the transmission system.

Having thus described the invention, what is claimed as new is:

1. Transmission control mechanism including spaced rods, a rotatable shaft mounted between said rods, shifters mounted on said rods and selectively movable for rendering a selected speed active, selectors slidable on said shaft but mounted to turn therewith, one of said shifters being slidable on one of said rods, a pawl pivoted upon said shifter and movable to selectively engage said selectors for coupling said shifter to move therewith as the selectors are slidably shifted, setting means operable by one of said selectors when slidably shifted on said shaft for rotating the shaft and automatically setting the selectors, said rod being rotatable, means carried by the rod to coact with said setting means for rotating the shaft and setting the selectors as the rod is rotated, and manually operable means connected with the other of said rods for actuating the other of said shifters, said manually operable means being movable to rotate the rod and render said pawl inactive.

2. In a control mechanism for selecting one of a plurality of speed ratios of a change speed gearing and rendering said speed ratio active or neutral, a shifting member, a rotatable and longitudinally movable member for selecting and moving the shifting member, yieldable coupling means carried by one of said members, said other member being provided with a recess for receiving the yieldable coupling means when said members are in a predetermined relative position to thereby connect the two members together for simultaneous longitudinal movement, means for rotating said rotatable and longitudinally movable member to permit the coupling means to engage in the recess or to cause it to be disengaged therefrom, means for moving said rotatable and longitudinally movable member longitudinally, and manually-controlled means for disabling said coupling means notwithstanding that the members are in a position where the coupling means is normally operable to connect the two members together.

3. In a control mechanism for selecting one of a plurality of speed ratios of a change speed gearing and rendering said speed ratio active or neutral, a shifting member, a rotatable and longitudinally movable member for selecting and moving the shifting member, yieldable coupling means carried by one of said members, said other member being provided with a recess for receiving the yieldable coupling means when said members are in a predetermined relative position to thereby connect the two members together for simultaneous longitudinal movement, means for rotating said rotatable and longitudinally movable member to cause the coupling means to engage in the recess or be disengaged therefrom, means for moving said rotatable and longitudinally movable member longitudinally, manually-controlled means for disabling said coupling means notwithstanding that the members are in a position where the coupling means is normally operable to connect the two members together, and including means for locking said shifting means from movement.

4. In a control mechanism for selecting one of a plurality of speed ratios of a change speed gearing and rendering said speed ratio active or neutral, a shifting fork, a rotatable and longitudinally movable member for selecting and moving the shifting fork, said shifting fork having a curved portion in overlying relation with the rotatable and longitudinally movable member and adapted for relative sliding movement thereto, a pivoted pawl carried by the shifting fork, the member being provided with a recess for receiving a portion of the pivoted pawl to thereby connect the member and the shifting fork together when they are in a predetermined relative position, means for rotating said rotatable and longitudinally movable member to cause the pawl to engage in the recess or be disengaged therefrom, means for moving said rotatable and longitudinally movable member longitudinally, and manually operable means for moving said pawl to a position where it is inoperable to engage the recess notwithstanding that the recess is in a position to receive the pawl.

5. In a control mechanism for selecting one of a plurality of speed ratios of a change speed gearing and rendering said speed ratio active or neutral, a shifting fork, a rotatable and longitudinally movable member for selecting and moving the shifting fork, said shifting fork having a curved portion in overlying relation with the rotatable and longitudinally movable member and adapted for relative sliding movement thereto, a pivoted pawl carrier by the shifting fork, the member being provided with a recess for receiving a portion of the pivoted pawl to thereby connect the member and the shifting fork together when they are in a predetermined relative position, means for rotating said rotatable and longitudinally movable member to cause the pawl to engage in the recess or be disengaged therefrom, means for moving said rotatable and longitudinally movable member longitudinally, manually operable means for moving said pawl to a position where it is inoperable to engage the recess notwithstanding that the recess is in a position to receive the pawl, and means engaging the pawl when in said last named inoperable position to thereby prevent the shifting fork from moving.

6. In a control mechanism for selecting one of a plurality of speed ratios of a change speed gearing and rendering said speed ratio active or neutral, a shifting member, a rotatable and longitudinally movable member for selecting and moving the shifting member, a pivoted pawl carried by said shiftable member, said other member being provided with a recess for receiving a portion of the pivoted pawl to thereby connect the members together when they are in a predetermined relative position, means for rotating said rotatable and longitudinally movable member to cause the pawl to engage in the recess or to be disengaged therefrom, means for moving said rotatable and longitudinally movable member longitudinally, a manually rotatable cam member for disabling said pawl, and means carried by said cam member and cooperating with the pawl when in its disabled position for locking the shifting means from moving.

7. In a control mechanism for a change speed gearing having a plurality of speed ratios and shifting means therefor, manually operable control means for moving one of the shiftable means to render active and neutral one of the speed ratios, means for alternately and successively selecting and moving the shifting means for the other speed ratios and including means for coupling said last named means to the shifting means, and a connection between the manually operable control means and the coupling means and operable by movement of the said control means to thereby cause said coupling means to be operable or inoperable.

8. In a control mechanism for a change speed gearing having a plurality of speed ratios and shifting means therefor, manually operable control means for moving one of the shiftable means to render active and neutral one of the speed ratios, means for alternately and successively selecting and moving the shifting means for the other speed ratios and including means for coupling said last named means to the shifting means, and a connection between the manually operable control means and the coupling means and operable by movement of the said control means when it is in a position rendering the speed ratio thereof neutral to thereby permit said coupling means to be operable.

9. In a control mechanism for a change speed gearing having a plurality of speed ratios and shifting means therefor, manually operable control means for moving one of the shiftable means to render active and neutral one of the speed ratios, means for alternately and successively selecting and moving the shifting means for the other speed ratios and including means for coupling said last named means to the shifting means, a connection between the manually operable control means and the coupling means and operable by movement of the said control when it is in a position rendering the speed ratio thereof neutral to thereby permit said coupling means to be operable, and means for locking the manually operable control means in its neutral position when it assumes a position permitting the coupling means to be operable.

10. In a control mechanism for a change speed gearing having a plurality of speed ratios, a pair of shifting forks therefor, manually operable means for moving one of the shifting forks to render active and neutral one of the speed ratios, means for alternately and successively selecting and moving the other shifting fork for other speed ratios and including means for coupling said last named means to the shifting fork, a connection between the manually operable control means and the coupling means and operable by movement of said control means to cause said coupling means to be operable and inoperable, means for preventing movement of the manual control means to operate its shifting fork when it is in a position causing the coupling means to be operable, and means operable by said connection for locking the other shifting fork when said connection is moved by the manual control means to cause the coupling means to be inoperable.

11. In a control mechanism for a change speed gearing having a plurality of speed ratios, a pair of shifting forks therefor, manually operable means for moving one of the shifting forks to render active and neutral one of the speed ratios, means for alternately and successively selecting and moving the other shifting fork for other speed ratios and including means for coupling said last named means to the shifting fork, a connection between the manually operable control means and the coupling means and operable by movement of said control means to cause said coupling means to be operable and inoperable, and means operable by said connection for locking the other shifting fork when said connection is moved by the manual control means to cause the coupling means to be inoperable.

12. In a control mechanism for a change speed gearing having a plurality of speed ratios, a pair of shifting forks therefor, manually operable means for moving one of the shifting forks to render active and neutral one of the speed ratios, a rotatable and longitudinally movable means for selecting and moving the other shifting fork to render active and neutral other speed ratios, yieldable coupling means carried by said last named fork and cooperating with recesses in the rotatable and longitudinally movable means for selectively coupling said means to said fork, means for moving the rotatable and longitudinally movable means longitudinally to render active and inactive a selected gear ratio, means operable by the longitudinal movement of said rotatable and longitudinally movable means for rotating said means to alternately select the speed ratios controlled by the last named shifting fork, means operable by the manually operable means for disabling said coupling means, and means cooperating with the coupling means when disabled to thereby prevent the shifting fork which carries the coupling means from being moved.

13. In a control mechanism for selecting one of a plurality of speed ratios of a change speed gearing and rendering said speed ratio active or neutral, a shifting member, a rotatable and longitudinally movable member for selecting and moving the shifting member, a yieldable pawl carried by one of said members and having its pivotal axis parallel with the axis of the rotatable and longitudinally movable member, said other member being provided with a recess for receiving said pawl to connect the members together when said members are in a predetermined relative position, means for rotating the rotatable and longitudinally movable member, and means for moving the rotatable and longitudinally movable member longitudinally.

14. In a control mechanism for a change speed gearing having a plurality of speed ratios, a rotatable selecting means, a pair of shifting forks mounted upon and overlying the selecting means, yieldable coupling means for connecting at least one of said forks to the selecting means when the selecting means and said forks assume a predetermined relative position, means for moving the selecting means longitudinally to thereby move said fork when connected thereto by the yieldable coupling means, and an interlocking means for preventing movement of the other shifting fork when the selecting means moves the shifting fork connected thereto by the yieldable coupling means.

15. In a control mechanism for selecting one of a plurality of sets of gearing forming a plurality of speed ratios of a change speed gearing and rendering said sets of gears active or neutral, a shifting member, a longitudinally movable member for moving the shifting member, said shifting member having a portion with a curved surface in semi-surrounding relation to the longitudinally movable member and supported thereby, coupling means carried by one of said members and adapted to interengage with the other member when said members are in a predetermined relative position to thereby connect the two members together for simultaneous movement, said coupling means being movable relatively to both of said members, selecting means for causing said coupling means to be operable or inoperable, and means for moving said longitudinally movable member longitudinally.

16. In a control mechanism for selecting one of a plurality of sets of gears forming a plurality of speed ratios of a change speed gearing and rendering said sets of gears active or neutral, a shifting member, a longitudinally movable member for moving the shifting member, said shifting member having a portion in semi-surrounding relation to the longitudinally movable member and supported thereon, a pivoted coupling member carried by one of said members and adapted to interengage with the other member when said members are in a predetermined relative position to thereby connect the two members together for simultaneous longitudinal movement, selecting means for causing said coupling means to be operable or inoperable, and means for moving said longitudinally movable member longitudinally.

17. In control mechanism for selecting one of a plurality of sets of gears forming a plurality of speed ratios of a change speed gearing and rendering said sets of gears active or neutral, a shifting member, a rotatable and longitudinally movable member for selecting and moving the shifting member, said shifting member having a portion in overlying contact relation with and supported upon the rotatable and longitudinally movable member for relative sliding movement, yieldable coupling means carried by one of said members, said other member being provided with a recess for receiving the yieldable coupling means when said members are in a predetermined relative position to thereby connect the two members together for simultaneous longitudinal movement, said coupling means being movable relative to both of said members, means for rotating said rotatable and longitudinally movable member to permit the coupling means to interengage with or to cause it to be disengaged from said recess, and means for moving said rotatable and longitudinally movable member longitudinally.

18. In a control mechanism for a change speed transmission having a plurality of speed ratios, a shifting member, two axially movable members for moving said shifting member in opposite directions, yieldable coupling means including a member movable relative to the shifting member and the axially movable members for selectively connecting the shifting member to said axially movable members, means separate from said axially movable members for causing said yieldable coupling means to assume an operable or an inoperable position, and means for moving the axially movable members axially in opposite directions.

19. In a control mechanism for a change speed transmission having a plurality of speed ratios, a shifting member, two axially movable members for moving said shifting member in opposite directions, yieldable coupling means including a member movable relative to the shifting member and the axially movable members for selectively connecting the shifting member to said axially movable members, means comprising a rotatable rod separate from the axially movable members for causing said yieldable coupling means to assume an operable or an inoperable position, and means for moving the axially movable members axially in opposite directions.

20. In a control mechanism for a change speed transmission having a plurality of speed ratios, a shifting member, combined rotatable and longitudinally slidable means for selecting a speed ratio and rendering it active or neutral, coupling means for connecting the shifting member to said combined rotatable and longitudinally slidable means, means separate from said combined means for causing said coupling means to assume an operable or an inoperable position with respect to the combined rotatable and longitudinally slidable means, common means for rotating said combined means and for controlling the operation of said last named means to govern the coupling means, and means for moving said combined rotatable and longitudinally slidable means longitudinally.

21. In a control mechanism for a change speed transmission having a plurality of speed ratios, a shifting member, combined rotatable and longitudinally slidable means for selecting a speed ratio and rendering it active or neutral, coupling means for connecting the shifting member to said combined rotatable and longitudinally slidable means, means comprising a rotatable rod and cam means for causing said coupling means to assume an operable or an inoperable position with respect to the rotatable and longitudinally slidable means, a single control member, means for rotating said combined means and said rod simultaneously by said single control member to thereby govern the operability of the coupling means, means for disconnecting the combined means from the control member to thereby permit the rod to be rotated separately, and means for moving said combined rotatable and longitudinally slidable means longitudinally.

22. In a control mechanism for a change speed transmission having a plurality of speed ratios, a shifting member, two axially movable members for moving said shifting member in opposite directions, said members being mounted for rotative movement, yieldable coupling means for connecting the shifting member to either of said axially movable members depending upon their rotative positions, means comprising a rotatable rod for causing the coupling means to assume a position where it is adapted to be operable or a position where it is inoperable notwithstanding the positions of the axially movable members, common means for rotating the axially movable members and the rotatable rod, and means for moving the axially movable members axially and in opposite directions.

GLENN T. RANDOL.